United States Patent
Chiang et al.

(10) Patent No.: US 7,583,056 B2
(45) Date of Patent: Sep. 1, 2009

(54) INTELLIGENT EQUALIZING BATTERY CHARGER HAVING EQUALIZATION CHARGING CIRCUITRY

(75) Inventors: Ray Chiang, Tainan (TW); Kelvin Lu, Kaohsiung Hsien (TW); Jeffrey Huang, Kaohsiung (TW)

(73) Assignee: Sino-American Electronic Co., Ltd., Kaohsiung Hsien (TW)

( * ) Notice: Subject to any disclaimer, the term of this patent is extended or adjusted under 35 U.S.C. 154(b) by 373 days.

(21) Appl. No.: 11/315,362

(22) Filed: Dec. 23, 2005

(65) Prior Publication Data

US 2007/0145946 A1    Jun. 28, 2007

(51) Int. Cl.
*H01M 10/46* (2006.01)
(52) U.S. Cl. ...................................... 320/118
(58) Field of Classification Search ................. 320/107, 320/116, 118, 119
See application file for complete search history.

(56) References Cited

U.S. PATENT DOCUMENTS 5,701,068 A * 12/1997 Baer et al. ................... 320/119
2001/0011881 A1 * 8/2001 Emori et al. ................. 320/116

\* cited by examiner

*Primary Examiner*—Edward Tso
(74) *Attorney, Agent, or Firm*—Senniger Powers LLP

(57) ABSTRACT

An intelligent equalizing battery charger having equalization charging circuitry is disclosed, comprising an insulating switch-type DC to DC converting circuit, a microprocessor monitoring/calculating control circuit, and a charging battery set wherein the insulating switch-type DC to DC converting circuit is composed of a power supply switch circuit, an insulating transformer, and a rectification converting circuit. The microprocessor monitoring/calculating control circuit includes multiple switch elements and a charging control microprocessor. Via the aforementioned structure, each individual cell of the charging battery set can be appropriately charged in equalization, which can not only increase the charging/discharging times of the battery set, but also efficiently extend the battery life in application.

16 Claims, 8 Drawing Sheets

INTELLIGENT EQUALIZING BATTERY CHARGER HAVING EQUALIZATION CHARGING CIRCUITRY

BACKGROUND OF THE INVENTION

The present invention is related to an intelligent equalizing battery charger having equalization charging circuitry, comprising an insulating switch-type DC to DC converting circuit, a microprocessor monitoring/calculating control circuit, and a charging battery set wherein the microprocessor monitoring/calculating control circuit, after the installment of the battery cells, can monitor the charging voltage and control the charging current during the whole charging process so that each cell of the battery set can be fully charged in equalization to achieve the best charging/discharging state thereby as well as to avoid the increase of the potential difference within the cells thereof, efficiently extending the battery life in application.

Please refer to FIG. 1. A conventional battery charger includes a charging circuitry 10 composed of a power supply switch circuit 11, a transformer 12, a rectification converting circuit, and a charging battery set 14. An AC power is supplied from the power input of the power supply switch circuit 11 to flow through a bridge rectifying circuit 111, a filtering capacitor 112 and a switch circuit 113. Then, the power supply is converted via the transformer 12 to feed a rectifying diode 131 of the rectifying convert circuit 13 and create a DC power supply that will pass through an output inductor 132 and a filtering capacitor 133 to provide the charging voltage required for the charging battery set 14 thereof.

There are some disadvantages to the above-mentioned conventional battery charger circuitry thereof. Most of all, in the charging process thereof, a charging voltage higher than the total voltage is supplied to the charging battery set 14 stringed in series, while each individual battery cell, characterized by a different rate of inner resistance after application, may require different charging voltage. As a result, the battery set 14 stringed in series for charging may become overcharged or undercharged in the process, which will cause the increase of the potential difference within the charging battery set 14 and, thus, reduce the lifespan of the battery in application.

SUMMARY OF THE PRESENT INVENTION

It is, therefore, the primary purpose of the present invention to provide an intelligent equalizing battery charger having equalization charging circuitry, comprising an insulating switch-type DC to DC converting circuit, a microprocessor monitoring/calculating control circuit, and a charging battery set wherein, after the installment of the battery set for charging, the microprocessor control circuit can monitor the charging voltage and control the charging current during the whole charging process so that each cell of the battery set can be fully charged in equalization to achieve the best charging/discharging state thereby as well as to avoid the increase of the potential difference within the cells thereof, efficiently extending the battery life in application.

It is, therefore, the second purpose of the present invention to provide an intelligent equalizing battery charger having equalization charging circuitry wherein the microprocessor monitoring/calculating control circuit can provide protection against connection in reverse, avoiding any damages to the battery cells during the charging process due to a wrong-electrode installment thereof. Besides, the microprocessor monitoring/calculating control circuit can also accurately control the charging time and protectively shut off the charging process in case of charging overtime, efficiently achieving the best state of application thereof It is, therefore, the third purpose of the present invention to provide an intelligent equalizing battery charger having equalization charging circuitry wherein the microprocessor monitoring/calculating control circuit can control multiple switch elements linked to the charging battery set respectively so that the cells of the battery set can be optionally charged either individually in separation or collectively in string, and can all attain an equalization charging effect thereby, achieving the best state of application thereof.

DETAILED DESCRIPTION OF THE PREFERRED EMBODIMENTS

Figure 1:
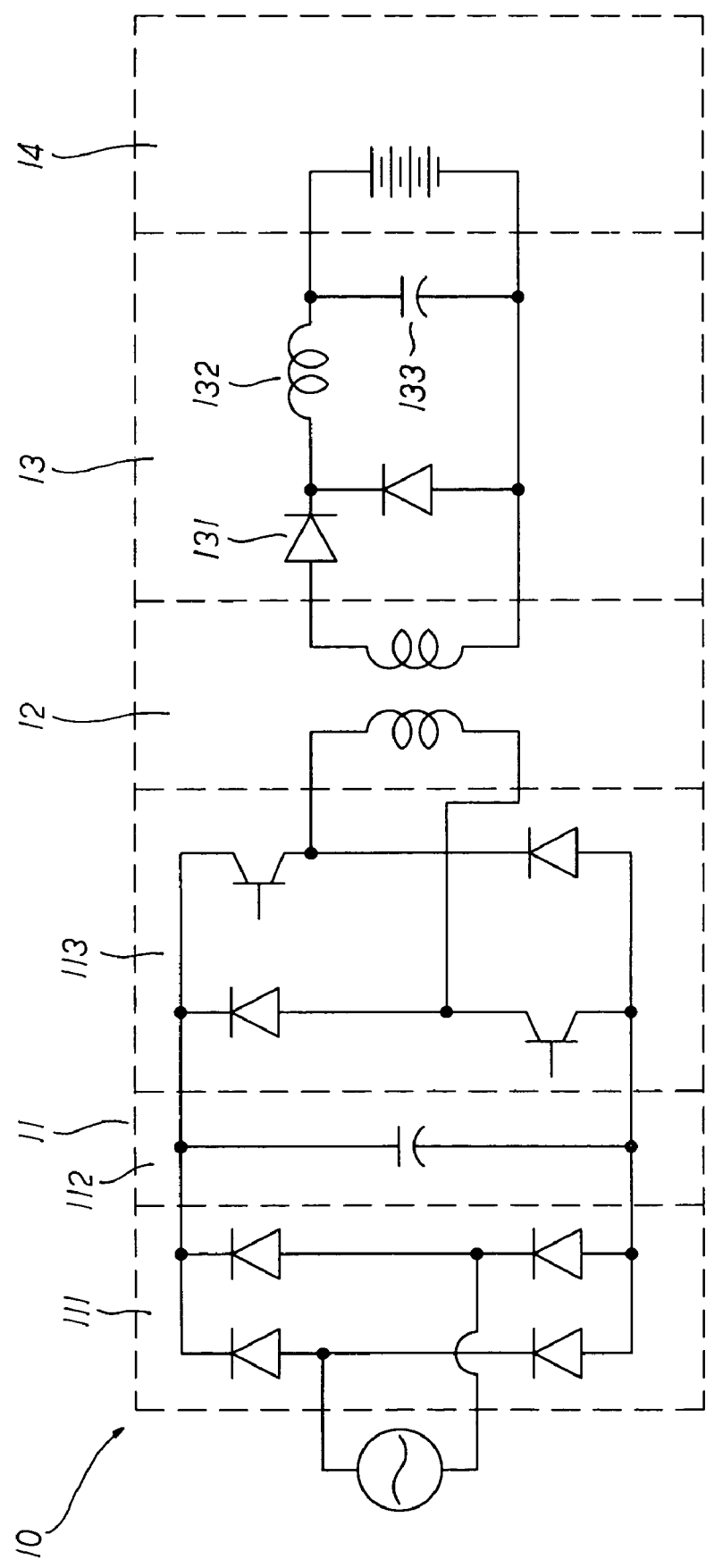
FIG. 1 is a diagram of the charging circuitry of a conventional battery charger.
Figure 2:
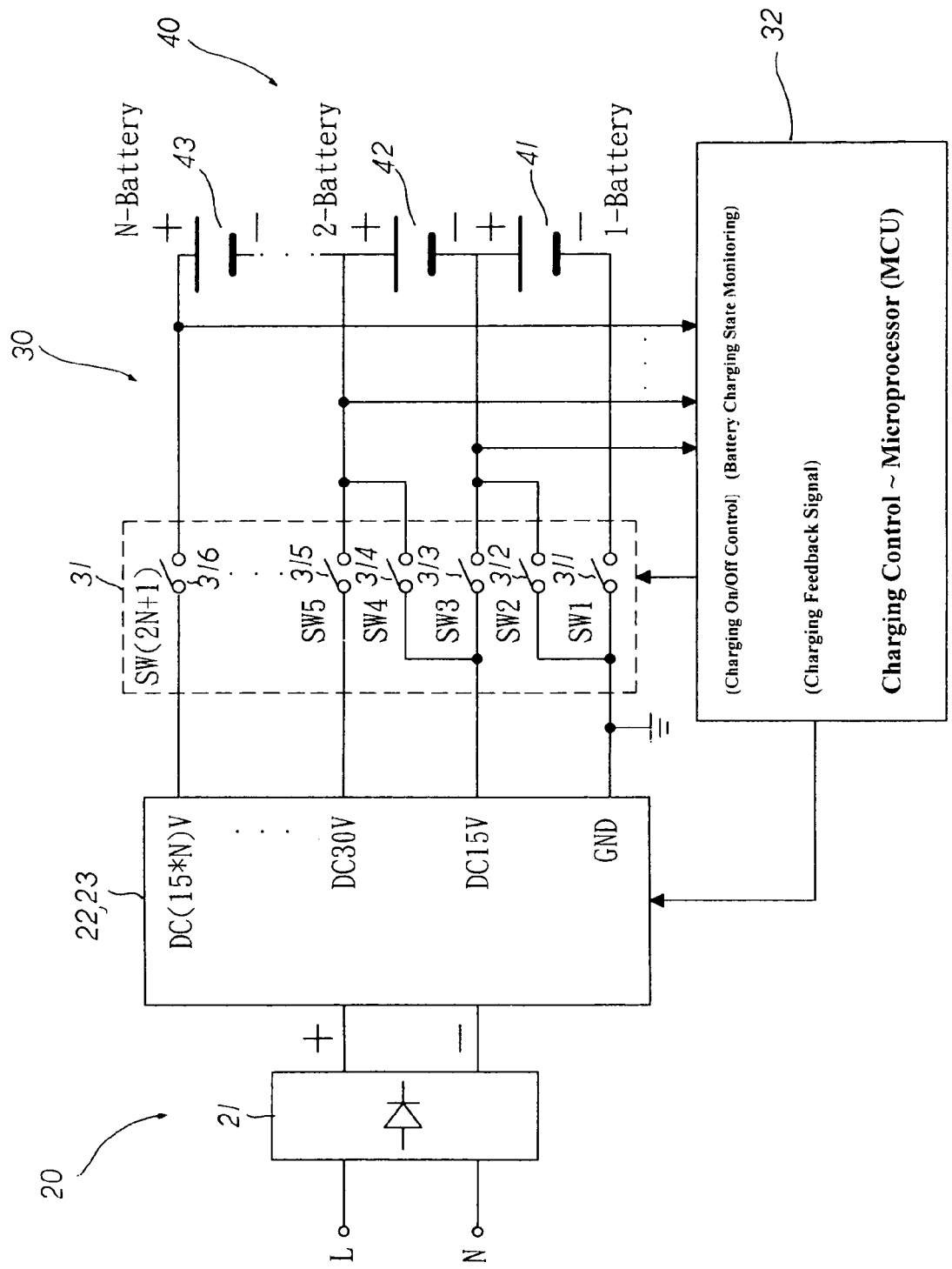
FIG. 2 is a diagram showing the charging circuitry of the present invention.
Figure 3:
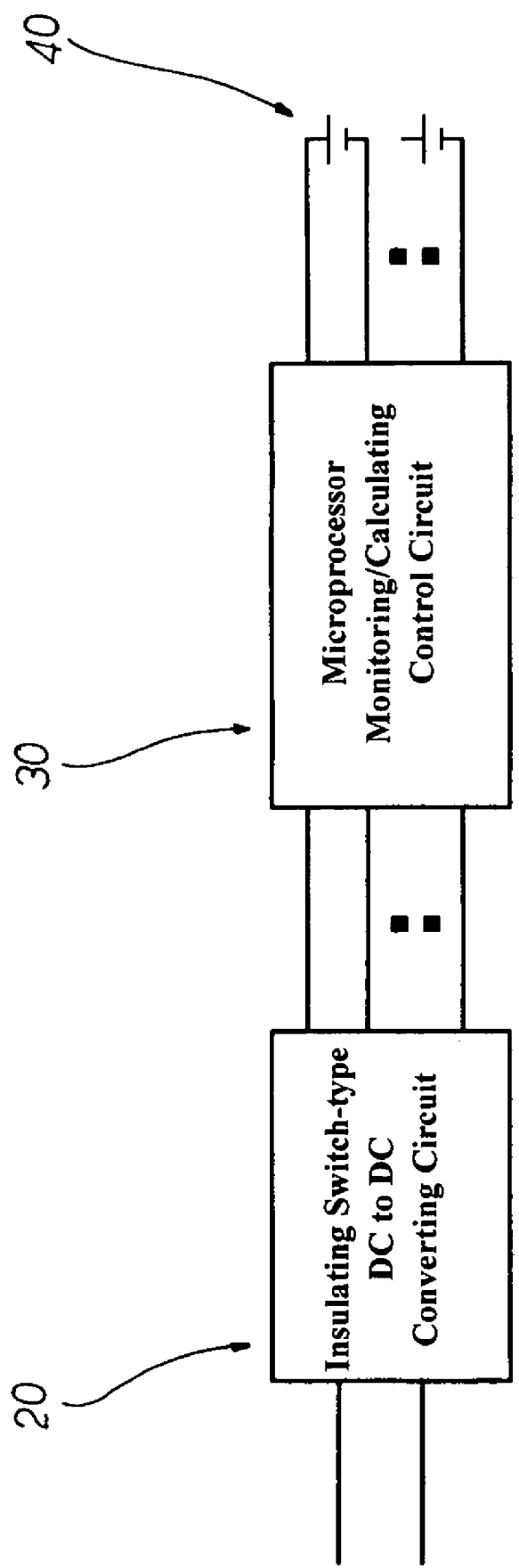
FIG. 3 is a diagram showing an insulating DC to DC converting circuit relative to a microprocessor monitoring/calculating control circuit of the present invention.
Figure 4:
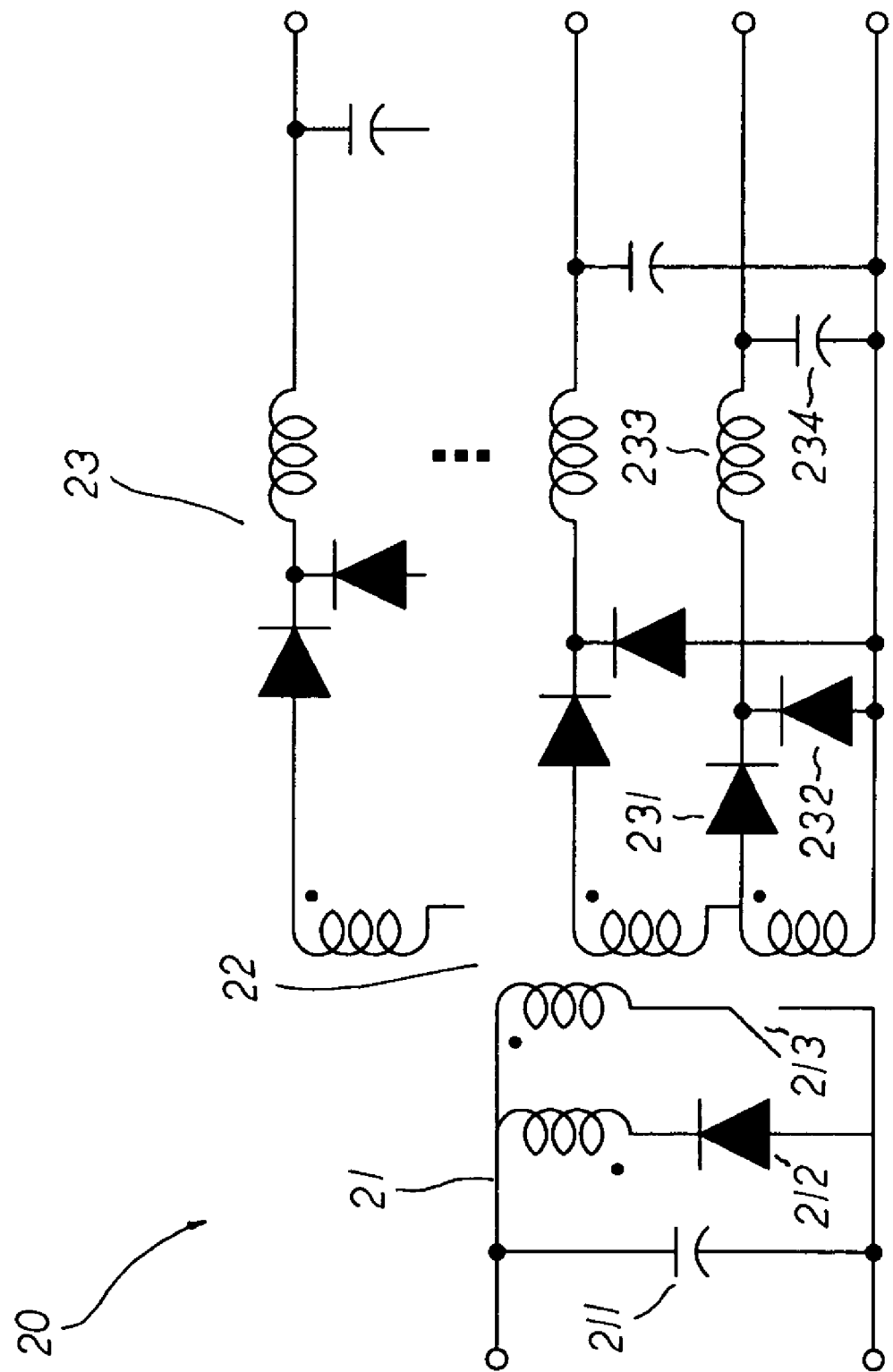
FIG. 4 is a diagram showing an insulating DC to DC converting circuit of the present invention.
Figure 5:
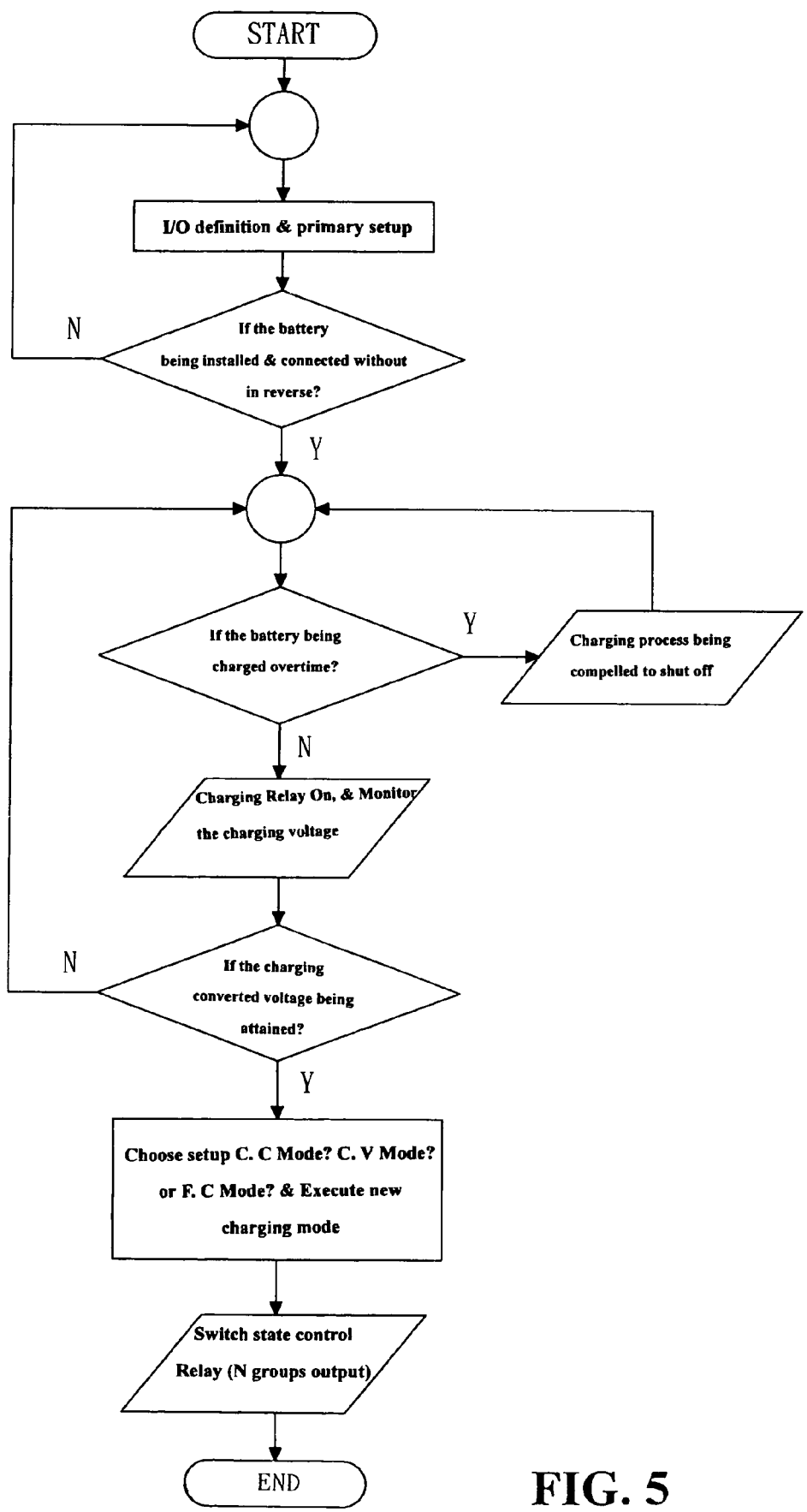
FIG. 5 is a flow chart of the process of a microprocessor monitoring/calculating control circuit of the present invention.

Please refer to FIG. 2 showing a charging circuitry of the present invention (accompanied by FIG. 3). The present invention is related to an intelligent equalizing battery charger having equalization charging circuitry, comprising an insulating-type DC to DC converter to supply the charging power source, and a set of microprocessor control circuit to monitor the state of a battery set stringed in series as well as to calculate for controlling the charging state of each cell in the battery set thereof. The equalization charging circuitry thereof includes a set of insulating switch-type DC to DC converting circuit 20, a set of microprocessor monitoring/calculating control circuit 30, and a charging battery set 40. The insulating switch-type DC to DC converting circuit 20 is composed of a power supply switch circuit 21, an insulating transformer 22, and a rectification converting circuit 23. The microprocessor monitoring/calculating control circuit 30 is equipped with multiple switch elements 31 and a charging control microprocessor 32 wherein the switch elements 31 are linked at one side to the charging battery set 40 stringed in series. The power supply switch circuit 21 as shown in FIG. 4 has a DC power source fed from an input end, and a switch 213 (composed of a transistor, MOS, SSR, etc.) linked to the primary coil is connected for the conduction of the DC power that will flow through a filtering capacitor 211 and feed into the primary coil set. Then, the DC power supply will be converted via the insulating transformer 22 to pass through the center-tapped type windings of the secondary coil and offer the power source to the rectification converting circuit 23 linked to the secondary coil thereof. The DC power is then conducted through a rectifying diode 231, a coupling inductor 233, and a filtering capacitor 234 to provide the DC power supply required for the microprocessor monitoring/calculating control circuit 30 thereof. And a signal wire is linked from the positive terminal of each cell of the charging battery set 40 to the charging control microprocessor 32 for monitoring the charging state of the battery set 40 thereby. Meanwhile, the charging control microprocessor 32 will first judge if the cells of the coupled battery set 40 are appropriately installed and correctly connected without in reverse as shown in FIG. 5. If so, charging signals will be emitted to switch on the switch elements 31 (composed of transistors, MOS, SSR, etc.) for the conduction of the power supply. And depending on the actual situation, the cells of the battery set 40 can be optionally chosen and charged either collectively in string or individually in separation. The following is a description of two cells 41, 42 of the battery set 40 in the charging process. To charge the cells 41, 42 collectively in string, the charging control microprocessor 32 will switch on the switch elements 311, 315 for the conduction of the power supply therethrough while the switch elements 312, 313, 314 are shut off from the power supply so as to link the two cells 41, 42 in series and form a charging circuit thereby. However, when the individual charging mode is chosen, the charging control microprocessor 32 will connect the switch elements 312, 314 for the conduction of power and shut off the switch elements 311, 313, 315 so that one of the cells 41, 42 can form an individual charging circuit in separation. And according to the actual number of the battery cell 43, a switch element 316 can be likewise increased to cooperatively work therewith. A signal wire is applied to connect the charging control microprocessor 32 with the rectification converting circuit 23 for providing signal to shut off the charging process thereby. When the switch 213 linked to the primary coil thereof is blocked from the power supply, a coupling inductor 233 linked to the side of the secondary coil thereof will feed the power to a filtering capacitor 234 via a freewheeling diode 232, and the primary coil set will start to release the magnetic flux of the transformer via a fast diode 212. Therefore, during the charging process thereof, the charging control microprocessor 32 will constantly detect the voltage of the charging battery set 40 and control the charging current to provide regulation in appropriate time so as to achieve the purpose of equalization charging thereby. Besides, the charging battery set 40 is provided with protection against connection in reverse so as to avoid any damages caused by the mistake of wrong-electrode installment, and the charging time of the battery set 40 is also controlled so that the power supply will be compelled to shut off if the battery set 40 is charged overtime, efficiently increasing the charging/discharging times of the charging battery and extending the battery life in application.

Figure 6:
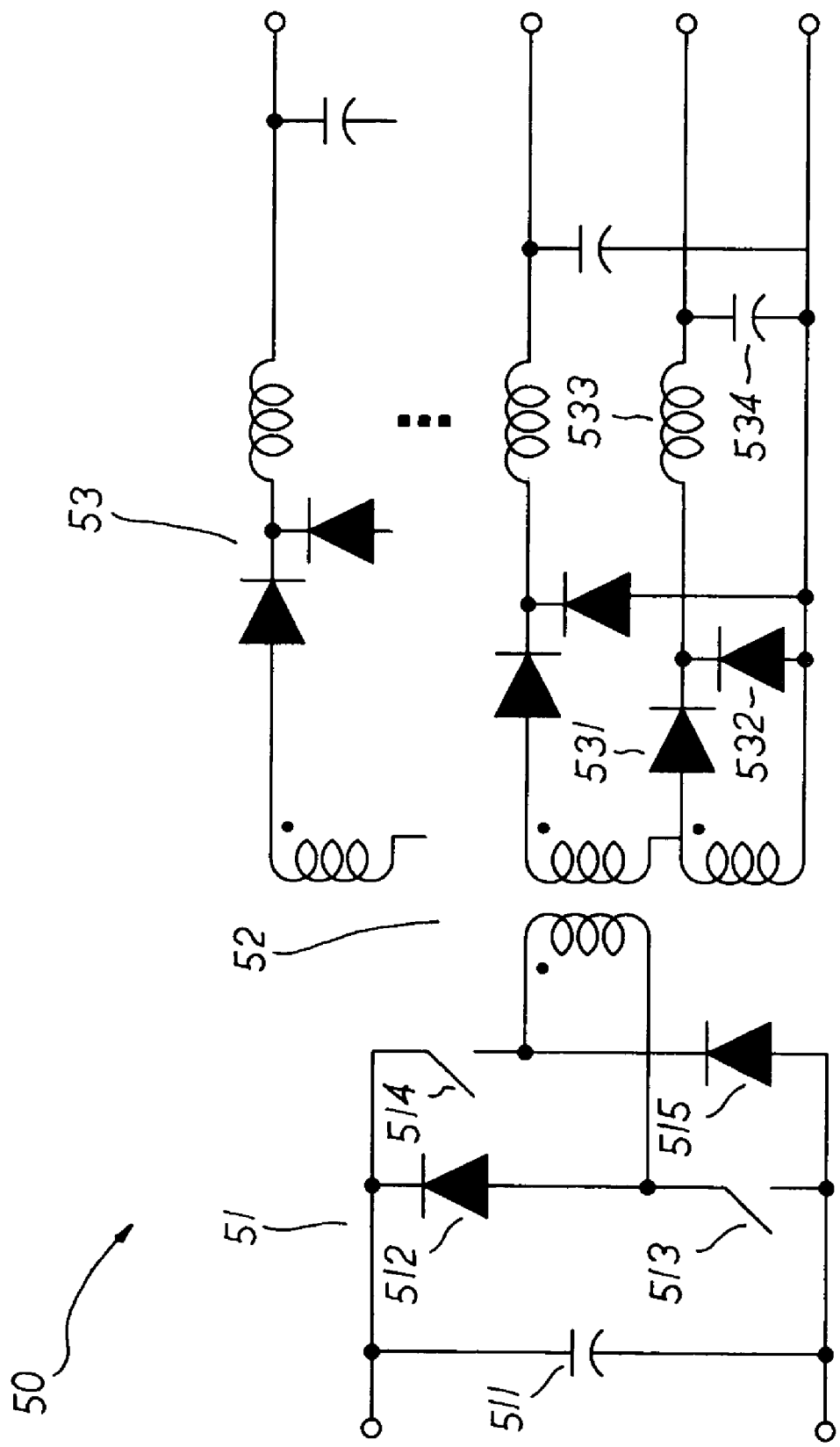
FIG. 6 is a diagram of another embodiment of the insulating DC to DC converting circuit of the present invention.

Please refer to FIG. 6 showing another embodiment of the power supply switch circuit of the present invention. A power supply switch circuit 51 linked to the primary coil thereof has a set of switches 513, 514 that can be simultaneously switched on for conduction, permitting the DC power supply to pass through a filtering capacitor 511 before converted through the insulating transformer 52 to feed a rectification converting circuit 53 linked to the secondary coil thereof. The power supply conducted then flows through a rectifying diode 531, a coupling inductor 533 and a filtering capacitor 534 to provide the DC power required for the microprocessor monitoring/calculating control circuit 30 thereof. When the switches 513, 514 linked to the primary coil are blocked from the power supply, the coupling inductor 533 linked to the secondary coil will provide the power supply to the filtering capacitor 534 via a freewheeling diode 532, and the primary coil set will start to release the magnetic flux of the insulating transformer 52 via a set of fast diodes 512, 515.

Figure 7:
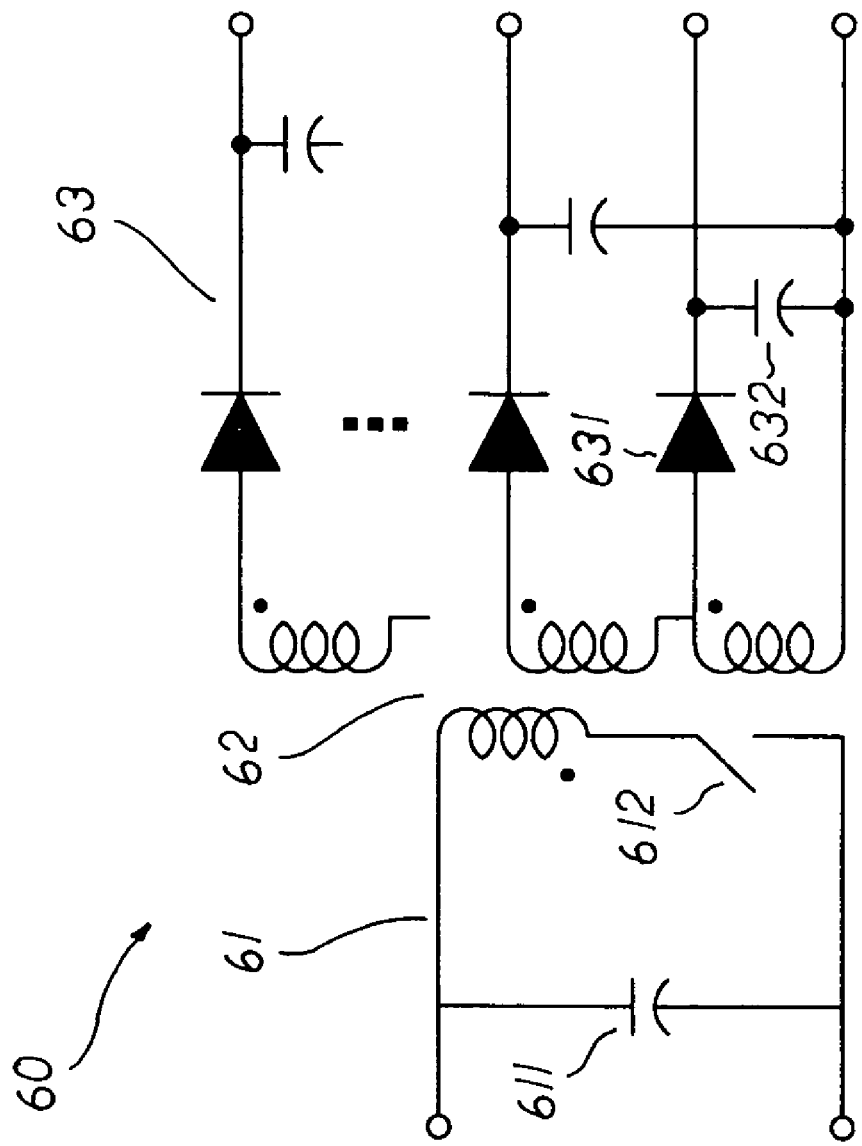
FIG. 7 is a diagram of a third embodiment of the insulating DC to DC converting circuit of the present invention.

Please refer to FIG. 7 showing a third embodiment of the power supply switch circuit of the present invention. The power supply convert circuit 61 linked to the primary coil has a switch 612 connected for conduction, permitting the DC power supply to pass through a filtering capacitor 611 before converted via an insulating transformer 62 to feed a rectification converting circuit 63 linked to the secondary coil thereof. Then, the power supply conducted will flow through a rectifying diode 631 and a filtering capacitor 632 to provide the DC power supply necessary for the microprocessor monitoring/calculating control circuit thereof. When the switch 612 linked to the primary coil is blocked from the power supply, the secondary coil will feed the power source to the filtering capacitor 632.

Figure 8:
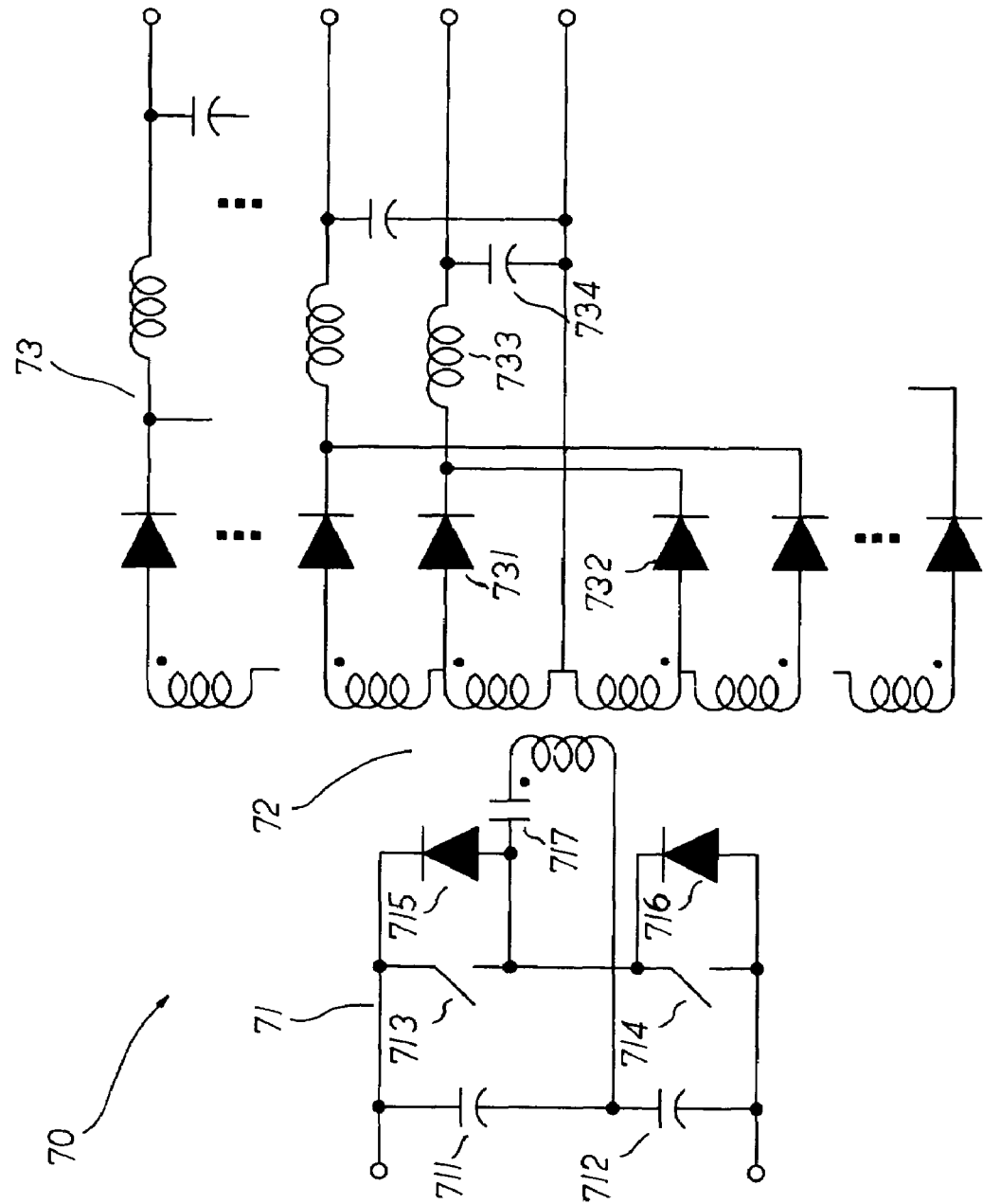
FIG. 8 is a diagram of a fourth embodiment of the insulating DC to DC converting circuit of the present invention.

Please refer to FIG. 8 showing a fourth embodiment of the power supply switch circuit of the present invention. A power supply switch circuit 71 linked to the primary coil thereof has a set of switches 713, 714 that can be simultaneously connected for conduction, permitting the DC power supply to pass through a set of filtering capacitor 711, 712 before converted through an insulating transformer 72 to feed a rectification converting circuit 73 linked to the secondary coil thereof. Then, the power supply conducted will flow through a rectifying diode 731, a coupling inductor 733 and a filtering capacitor 734 to provide the DC power supply required for the microprocessor monitoring/calculating control circuit 30 thereof. When the switches 713, 714 linked to the primary coil are blocked from the power supply, the coupling inductor 733 linked to the secondary coil will provide the power to the filtering capacitor 734 via another rectifying diode 732, and the primary coil set will start to release the magnetic flux of the insulating transformer 72 via a set of fast diodes 715, 716. Besides, a resonant capacitor 717 is also linked to the primary coil so as to maintain the volt-sec balance of the insulating transformer 72 thereby.

Furthermore, the center-tapped type windings of the secondary coil of the insulating transformer 22, the rectification converting circuit 23, and the switch elements 31 of the microprocessor monitoring/calculating control circuit 30 can be flexibly augmented to cooperatively match to the cell number of the charging battery set 40 as allowed within the scope of the circuitry thereof.

What is claimed is:

1. An intelligent equalizing battery charger having equalization charging circuitry, composed of a set of insulating-type DC to DC converter to supply power source for the charging thereof, and a set of microprocessor control circuitry to monitor the state of a battery set stringed in series and to calculate for control of the charging state of each individual cell of the battery set wherein the equalization charging circuitry includes a set of insulating switch-type DC to DC converting circuit, a set of microprocessor monitoring/calculating control circuit, and a charging battery set, wherein the insulating switch-type DC to DC converting circuit includes a power supply switch circuit, an insulating transformer, and a rectification converting circuit, wherein the power supply switch circuit is a MOS or a SSR.

2. The intelligent equalizing battery charger having equalization charging circuitry as claimed in claim 1 wherein the insulating transformer of the switch-type DC to DC converting circuit is composed of a primary coil set, an inductive magnetic-flux-release coil set linked to the primary coil, and a center-tapped type secondary coil set; the DC power supply is conducted through the power supply switch circuit linked to the primary coil set thereof and converted across the center-tapped type windings of the secondary coil thereof to pass through the rectification converting circuit respectively and feed the corresponding cell of the charging battery set stringed in series.

3. The intelligent equalizing battery charger having equalization charging circuitry as claimed in claim 1 wherein the power supply switch circuit linked to the primary coil thereof has a filtering capacitor connected thereto for rectifying the DC power supply, and a switch having the function of switching on/off; the rectification converting circuit linked to the secondary coil thereof has a rectifying diode, a freewheeling diode, a coupling inductor, and a filtering capacitor connected thereto.

4. The intelligent equalizing battery charger having equalization charging circuitry as claimed in claim 3 wherein the switch of the power supply switch circuit linked to the primary coil thereof is switched on for conduction, permitting the DC power supply to pass through the filtering capacitor before converted through the insulating transformer to feed the rectification converting circuit linked to the secondary coil thereof; then the power supply will flow through the rectifying diode, the coupling inductor, and the filtering capacitor to provide the DC power supply required for the microprocessor monitoring/calculating control circuit thereby; when the switch linked to the primary coil is blocked from the power supply, the coupling inductor linked to the secondary coil thereof will feed the power supply to the filtering capacitor via the freewheeling diode, and the primary coil set thereof will start to release the magnetic flux of the transformer via a fast diode.

5. The intelligent equalizing battery charger having equalization charging circuitry as claimed in claim 1 wherein the power supply switch circuit linked the primary coil set includes a filtering capacitor for rectifying the DC power supply, two switches having the function of switching on/off, and two fast diodes that are respectively matched to the rectification converting circuit corresponding to the battery set thereof; the rectification converting circuit linked to the secondary coil thereof has a rectifying diode, a freewheeling diode, a coupling inductor, and a filtering capacitor connected thereto.

6. The intelligent equalizing battery charger having equalization charging circuitry as claimed in claim 5 wherein the switches of the power supply switch circuit linked to the primary coil thereof are simultaneously switched on for conduction, permitting the DC power supply to pass through the filtering capacitor before converted through the insulating transformer to feed the rectification converting circuit linked to the secondary coil thereof; then, the power supply will flow through the rectifying diode, the coupling inductor, and the filtering capacitor to provide the DC power required for the microprocessor monitoring/calculating control circuit thereby; when the switches at the primary side are blocked from the power supply, the coupling inductor linked to the secondary coil thereof will provide the power to the filtering capacitor through the freewheeling diode, and the primary coil set thereof will start to release the magnetic-flux of the transformer via the fast diodes thereof.

7. The intelligent equalizing battery charger having equalization charging circuitry as claimed in claim 1 wherein the power supply switch circuit linked to the primary coil has a filtering capacitor for rectifying the DC power supply and a switch having the function of switching on/off that are matched to the rectification converting circuit corresponding to the battery set thereof; the rectification converting circuit linked to the secondary coil thereof has a rectifying diode and a filtering capacitor.

8. The intelligent equalizing battery charger having equalization charging circuitry as claimed in claim 7 wherein the switch linked to the primary coil thereof is switched on for conduction, permitting the DC power supply to pass through the filtering capacitor before converted through the insulating transformer to feed the rectification converting circuit linked to the secondary coil thereof; then, the power supply will flow through the rectifying diode and the filtering capacitor to provide the DC power supply required for the microprocessor monitoring/calculating control circuit thereby; when the switch linked to the primary coil is blocked from the power supply, the secondary coil thereof will provide the power supply to the filtering capacitor thereof.

9. The intelligent equalizing battery charger having equalization charging circuitry as claimed in claim 1 wherein the power supply switch circuit linked to the primary coil thereof has a filtering capacitor for rectifying the DC power supply, two switches having the function of switching on/off, two fast diodes, and a resonant capacitor that are respectively matched to the rectification converting circuit corresponding to the battery set thereof; the rectification converting circuit linked to the secondary coil thereof has two rectifying diodes, a coupling inductor, and a filtering capacitor.

10. The intelligent equalizing battery charger having equalization charging circuitry as claimed in claim 9 wherein the switches linked to the primary coil thereof are simultaneously switched on for conduction, permitting the DC power supply to pass through the filtering capacitor before converted through the insulating transformer to feed the rectification converting circuit linked to the secondary coil thereof; then, the power supply will flow through one rectifying diode, the coupling inductor, and the filtering capacitor to provide the DC power supply required for the microprocessor monitoring/calculating control circuit thereby; when the switches linked to the primary coil thereof are blocked from the power supply, the coupling inductor linked to the secondary coil thereof will provide the power supply to the filtering capacitor through another rectifying diode, and the primary coil set thereof will start to release the magnetic-flux of the transformer via the fast diodes thereof; the resonant capacitor is set to maintain the volt-sec balance of the insulating transformer thereby.

11. The intelligent equalizing battery charger having equalization charging circuitry as claimed in claim 1 wherein the microprocessor monitoring/calculating control circuit is composed of multiple switch elements and a charging control microprocessor that are cooperatively matched to the charging battery set thereof.

12. The intelligent equalizing battery charger having equalization charging circuitry as claimed in claim 11 wherein the switch elements thereof are composed of transistors.

13. The intelligent equalizing battery charger having equalization charging circuitry as claimed in claim 11 wherein the switch elements thereof are composed of MOS.

14. The intelligent equalizing battery charger having equalization charging circuitry as claimed in claim 11 wherein the switch elements thereof are composed of SSR.

15. The intelligent equalizing battery charger having equalization charging circuitry as claimed in claim 11 wherein the switch elements of the micro-processing monitoring/calculating control circuit are augmented to correspondingly match to the cell number of the charging battery set thereby.

16. The intelligent equalizing battery charger having equalization charging circuitry as claimed in claim 2 wherein the center-tapped type windings of the secondary coil of the insulating transformer, and the rectification converting circuit is augmented to match to the cell number of the charging battery set thereby.

* * * * *